United States Patent [19]
Stanke et al.

[11] Patent Number: 6,018,496
[45] Date of Patent: Jan. 25, 2000

[54] METHOD AND APPARATUS FOR HYDRAULIC ISOLATION DETERMINATION

[75] Inventors: Fred E. Stanke, Ridgefield; Ralph M. D'Angelo, New Fairfield, both of Conn.

[73] Assignee: Schlumberger Technology Corporation, New York, N.Y.

[21] Appl. No.: 08/442,610

[22] Filed: May 17, 1995

Related U.S. Application Data

[63] Continuation of application No. 08/206,687, Mar. 4, 1994, abandoned, which is a continuation of application No. 08/018,642, Feb. 17, 1993, abandoned, which is a continuation-in-part of application No. 07/810,772, Dec. 17, 1991, abandoned.

[51] Int. Cl.[7] ...................................................... G01V 1/40
[52] U.S. Cl. ............................... 367/35; 181/105; 367/31
[58] Field of Search .................................. 367/25, 31, 35, 367/86, 911; 181/102, 104, 105; 73/151, 152

[56] References Cited

U.S. PATENT DOCUMENTS

| | | | |
|---|---|---|---|
| 2,538,114 | 1/1951 | Mason | 73/67 |
| 3,308,426 | 3/1967 | Wilson | 340/18 |
| 3,401,773 | 9/1968 | Synnott, III | 181/5 |
| 3,496,533 | 2/1970 | Semmelink | 340/17 |
| 4,003,244 | 1/1977 | O'Brien et al. | 73/67.8 R |
| 4,031,751 | 6/1977 | Haddad | 73/155 |
| 4,184,562 | 1/1980 | Bakamjian | 181/104 |
| 4,255,798 | 3/1981 | Havira | 367/35 |
| 4,800,537 | 1/1989 | Mount, II | 367/35 |
| 4,802,145 | 1/1989 | Mount II | 367/35 |
| 4,805,156 | 2/1989 | Attali et al. | 367/35 |
| 4,809,237 | 2/1989 | Vogel | 367/35 |
| 4,896,303 | 1/1990 | Leslie et al. | 367/35 |
| 5,001,676 | 3/1991 | Broding | 367/31 |

*Primary Examiner*—Ian J. Lobo
*Attorney, Agent, or Firm*—William B. Batzer; Brigitte L. Jeffery; David P. Gordon

[57] ABSTRACT

A method and apparatus for determining the hydraulic isolation of layers in an earth formation. The characteristics of various interfaces between the materials in the borehole are evaluated. An acoustic investigation is performed by directing an acoustic signal at a radial segment of the borehole. The signal passes through the casing and the fill material and produces a resulting signal which has travelled along a path encountering various interfaces in the borehole. This signal is processed to make hydraulic isolation determinations.

56 Claims, 11 Drawing Sheets

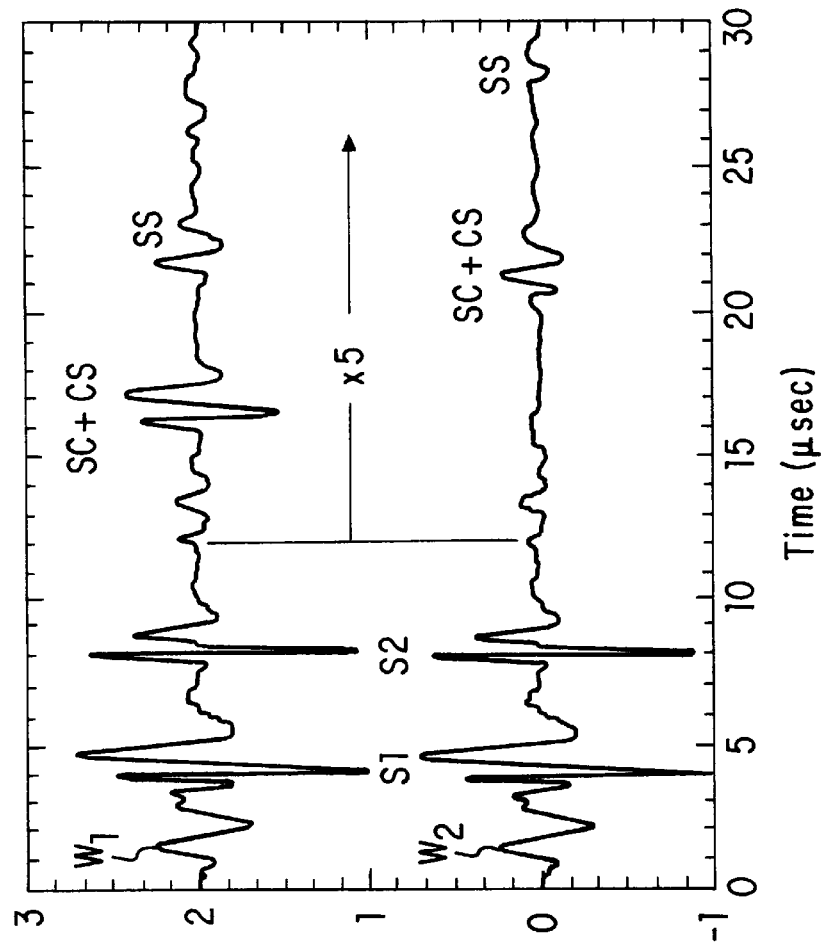
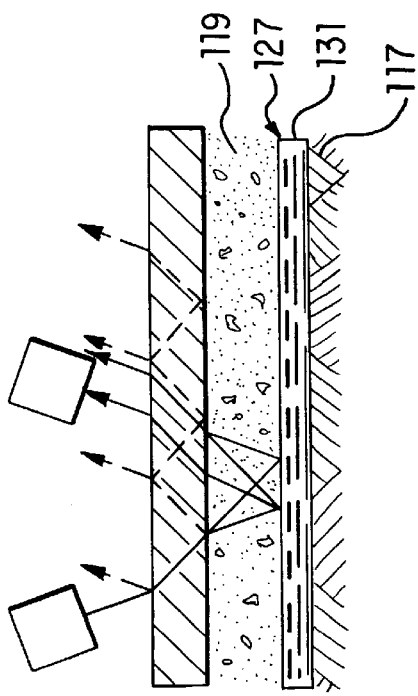
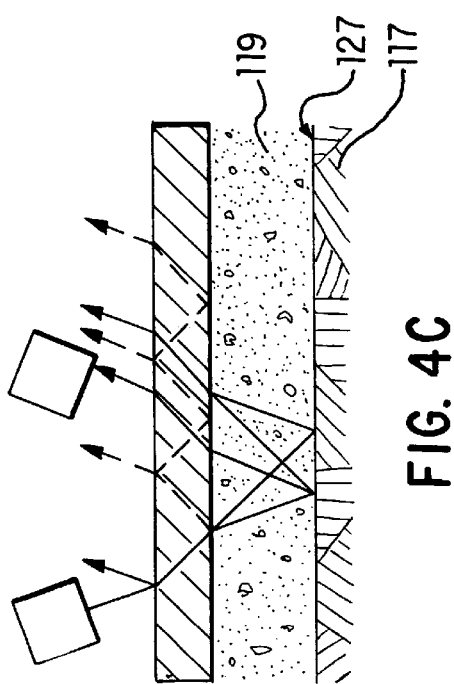
FIG. 4A
FIG. 4B
FIG. 4C

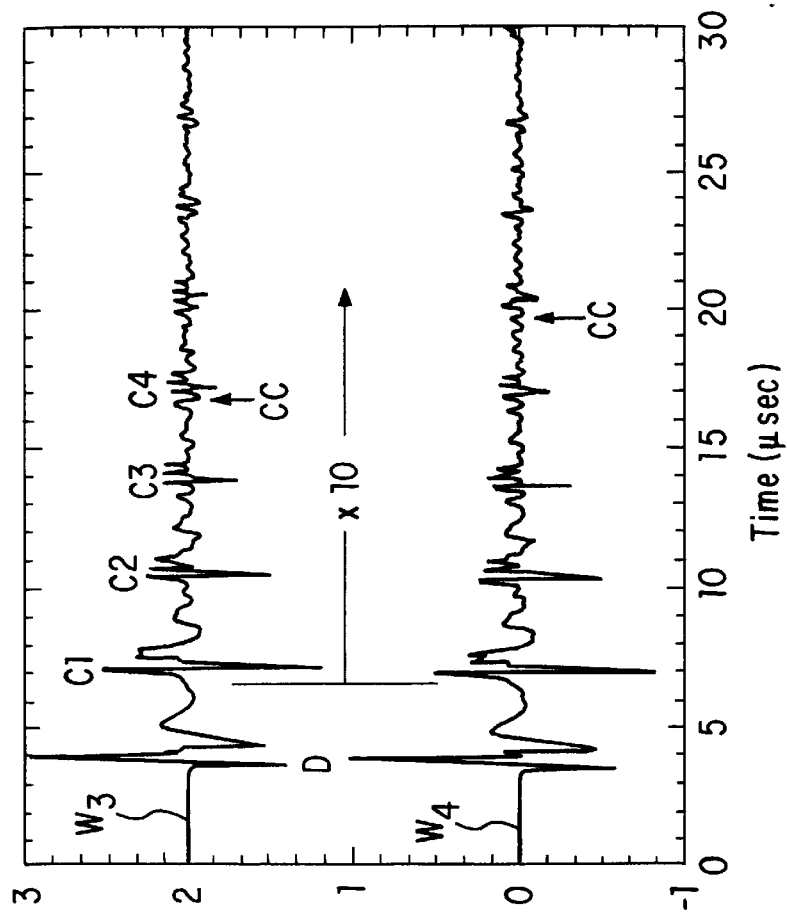
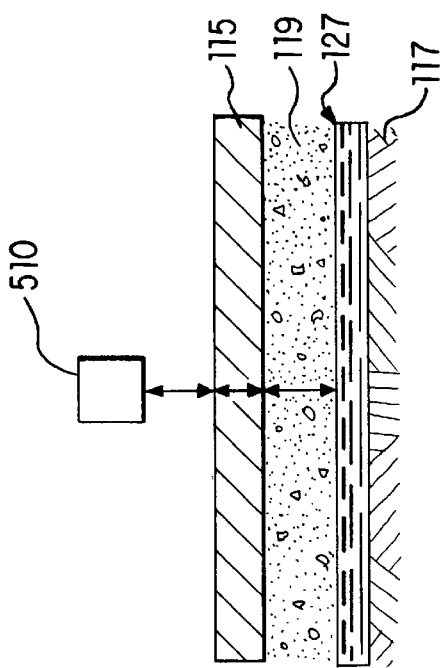
FIG. 5B
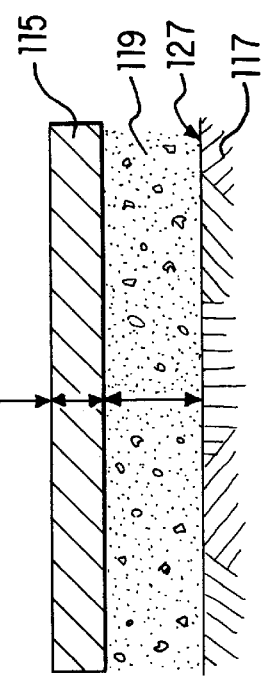
FIG. 5C
FIG. 5A

METHOD AND APPARATUS FOR HYDRAULIC ISOLATION DETERMINATION

This application is a file wrapper continuation of prior application Ser. No. 08/206,687, filed on Mar. 4, 1994 now abandoned, which is a continuation of prior application Ser. No. 08/018,642, filed on Feb. 17, 1993 now abandoned, which is a continuation-in-part of prior application Ser. No. 07/810,772 filed Dec. 17, 1991 now abandoned.

BACKGROUND OF THE INVENTION

The present invention relates to a method and apparatus for hydraulic isolation determination of oilfield casings. More specifically, the interfaces between the various materials present in the borehole are interrogated using ultrasonic energies to characterize the materials and the bonds formed between them.

In a well completion, a string of casing or pipe is set in a wellbore and a fill material referred to as cement is forced into the annulus between the casing and the earth formation. The primary purpose of the cement is to separate oil and gas producing layers from each other and from water bearing strata. If cement fails to provide isolation of one zone from another, fluids under pressure may migrate from one zone to another, reducing production efficiency. Migration of water, in particular, produces undesirable water cutting of a producing zone and can possibly render a well non-commercial. Also, migration of hydrocarbons into aquifers is environmentally and economically undesirable. It is critical to determine whether the cement is performing its function, i.e., whether the hydrocarbon reservoirs are hydraulically secure. The term "good cement" indicates the adequate separation of zones by the cement, preventing fluid migration between the zones.

Cement failures occur in a variety of ways. For example, a complete absence of cement between the casing and the earth formation can occur. This is characterized as a gross cement failure and leads to rapid communication between zones intended to be isolated. Another type of failure arises when channeling occurs within the cement annulus, between the casing and the formation. There are three commonly occurring types of channels. First, a channel which contacts the casing is referred to as a "near channel". Second, a channel which does not contact the casing is referred to as a "far channel" or a "buried-channel". For a buried channel, the region between the channel and the casing is usually cement. And third, a channel occupying the entire space between the casing and the formation is referred to as either a "full channel" or a "traditional channel". All these channels described above are filled with fluids such as mud or gas and all are potential threats to hydraulic isolation.

Another condition which occurs, but which is not generally viewed as a cement failure, is known as micro-annulus. This condition occurs when the cement that has filled the annulus is not properly bonded to the casing resulting in a very narrow fluid-filled annulus immediately outside the casing. This annulus is very small and does not affect fluid communication between layers effectively preserving the hydraulic security function of the cement.

A completed well includes a number of interfaces at the junctures of the differing materials within the wellbore. A first interface exists at the juncture of the fluid in the casing and the casing itself. The casing is referred to as a first material and is typically made of steel. A second interface is formed between the casing and a second material adjacent to the exterior of the casing. If cement is properly placed between the casing and the formation, providing hydraulic isolation, the second interface exists between the casing (first material) and the cement (second material). Further, a third interface exists between the cement and a third material which is the earth formation.

Imperfect cementing operations can result in a variety of interface conditions. A channel contacting the casing results in the second interface being between the casing (first material) and a fluid (second material). In this case, the third interface is formed between a fluid (second material) and the earth formation (third material) where a full channel exists. Alternatively, the third interface is formed between a fluid (second material) and the cement (third material) where a near channel exists. A channel not contacting the casing, results in the second interface being between the casing (first material) and the cement (second material) and the third interface being between the cement (second material) and a fluid (third material). Existence of an interface at the juncture of cement and fluid causes a potential lack of hydraulic isolation.

The problem of investigating the fill material or cement outside a casing with a tool located inside the casing has lead to a variety of cement evaluation techniques using acoustic energy. These techniques can be categorized into sonic cement evaluation (SCE) and ultrasonic cement evaluation (UCE).

Current sonic cement evaluation can be divided into two distinct categories. The first evaluates the Cement Bond Index (CBI) which attempts to measure the percentage of the circumference of the cement adhering to the casing. The second generates a variable density log which qualitatively evaluates the cement fill in the annulus by identifying a head wave generated by a compressional wave in the formation. Both sonic techniques use non-directional or slightly directional sources and receivers and depend on energy propagation essentially parallel to the surfaces of the casing.

One SCE technique is described in U.S. Pat. No. 3,401,773 to Synott, III and assigned to Schlumberger Technology Surveying Corp. Synott describes a cement logging technique using a tool employing a conventional, longitudinally spaced, sonic transmitter and receiver. The signal traveling through the casing is processed and a portion of the signal affected by the presence or absence of cement is extracted. The extracted segment is interrogated to provide a measurement of its energy as an indication of the presence or absence of cement outside the casing. This technique provides useful information about cement defects at the second interface.

Current ultrasonic cement evaluation also concentrates on the second interface to determine whether cement or mud is adjacent to the casing in an annulus between the casing and the earth formation. A number of known techniques use a pulse-echo method. A single transducer transmits energy into the casing at near-normal incidence and receives echoes. The signal excites a resonance within the casing and the properties of the resonance are measured and interpreted to indicate whether cement or undisplaced mud lies just outside the casing. The main limitation of such techniques is that they concentrate on the second interface ignoring the effects of the third or further interfaces.

Ultrasonic pulse-echo techniques for determining the thickness of materials have been extensively proposed in the art. For example, U.S. Pat. No. 2,538,114 to Mason describes an apparatus for measuring the thickness of a material by noting its resonance frequency whenmaterial is irradiated with ultrasonic energy. In U.S. Pat. No. 4,003,244 to O'Brien, et al., the thickness of a material is measured by employing a pulse echo technique.

U.S. Pat. No. 4,255,798 to Havira describes methods and apparatuses for acoustically investigating a casing in a borehole to determine whether cement is present just outside the casing. Casing thickness is also determined. The techniques employ an acoustic pulse source having a frequency spectrum selected to excite a thickness resonance in the insonified portion of the casing. The thickness resonance exists as acoustic reverberations between the inner and outer walls of the casing, i.e., trapped energy. The duration of the reverberations depends on the rate of acoustic energy leaking into adjacent media. The acoustic return from the casing can be thought of in two distinct portions. The first appears as a large amplitude pulse which represents the energy reflected from the first fluid-steel interface, i.e., the inside surface of the casing. The second appears as a decaying resonance which represents the reverberating energy trapped within the casing that has leaked back into the fluid within the casing. The received acoustic pulse is then processed to determine casing thickness or to evaluate the quality of the cement bond to the casing.

SUMMARY OF THE INVENTION

The present invention provides a method and apparatus for determining the hydraulic isolation in oilfield casings. Hydraulic isolation determinations are made by considering the entire volume of the annulus between the casing and the earth formation and characterizing the third interface formed at the juncture of a second material contacting the outside of the casing (first material) and a third material adjacent to and outside the second material. Interrogation of the third interface is performed by directing an acoustic pulse at a segment of the casing. This pulse passes through the casing and into the second material. The signal is then reflected from the third interface and passes back through the second material as well as the casing and into the borehole where it is detected.

The acoustic investigation is performed by an apparatus comprising a housing, transmission means, receiver means, and processing means. The transmission means are mounted in the housing and introduce acoustic energy as a beam which propagates with substantially constant width in the casing at a predetermined initial angle to a first interface. The predetermined angle is selected such that the shear portion of the acoustic energy in the casing travels along a reflective path and reflects from at least one of a second interface and a third interface, and any compressional portion of the acoustic energy in the casing travels substantially parallel to the first interface. The receiver means, which is mounted in the casing a predetermined distance from the transmission means, detects the shear portion which has traveled along the reflective path and which arrives at the first interface. The receiving means detects no substantial energy resulting from the compressional portion. Processing means generate data determinative of the reflective path traveled by the shear portion and representative of properties of the materials in the borehole.

The present technique includes advantages over ultrasonic cement evaluation because it utilizes non-normal propagation, preferably between the compressional and shear critical angles in the casing (intercritical), using a pitch-catch operating mode where the transmitter and receiver are separated from one another. This configuration examines a signal which contains discrete arrivals representing acoustic echoes from distinct interfaces. Processing concentrates on an analysis of each arrival independently of arrivals from other interfaces, rather than on a casing resonance containing all interface echoes, as do UCE techniques.

The present technique achieves superior results to sonic cement evaluation because there is a strong radial component of propagation and the transducers are highly directional. The directionality of the transducers distinguishes the method from typical surface seismic techniques which use essentially omni-directional transducers. In addition, the configuration of the transducers is set using a predetermined angular operation for the particular transducers along with predetermined distances between the transducers. The angles of the transducers are chosen to optimize shear signals within the casing and to exclude compressional signals. By concentrating the operation of transmission or reception to a beam of substantially constant width, the reflection path of the shear signals of interest are reduced to a group of signals which uniquely represent the materials and geometries of the borehole, and other signals which create interference are greatly reduced or eliminated.

The basic advantage of a hydraulic isolation determination apparatus and method in accordance with the present invention is that the shear signals resulting upon encountering the various interfaces are well separated in time and space. This allows accurate analysis of the individual components of the recorded signals. These components are characterized to provide an indication of the quality of isolation achieved by the fill material or cement outside the casing. Additionally, since shear energy which has interacted primarily with the casing exists as separate components of the resulting signal, casing thickness can be determined. Separation of components is accomplished by configuring the transducers at an angular position, separated by a predetermined distance, and by using compact excitation pulses. Further, compressional signals which can be a source of noise interfering with an accurate signal analysis, are not detected due to the preselected angles and positioning of the transducers.

A further understanding of the nature and advantages of the invention may be realized with reference to the remaining portions of the specification and drawings.

BRIEF DESCRIPTION OF THE DRAWINGS

FIG. 4 is an illustration of the travel paths of acoustic energy components through various materials in the borehole;

FIG. 5 is an illustration of acoustic energy arrivals which have traveled along paths in a borehole wherein the acoustic energy is generated by a transducer and received along a line perpendicular to the wall of the borehole;

DETAILED DESCRIPTION OF THE PREFERRED EMBODIMENTS

Figure 1:
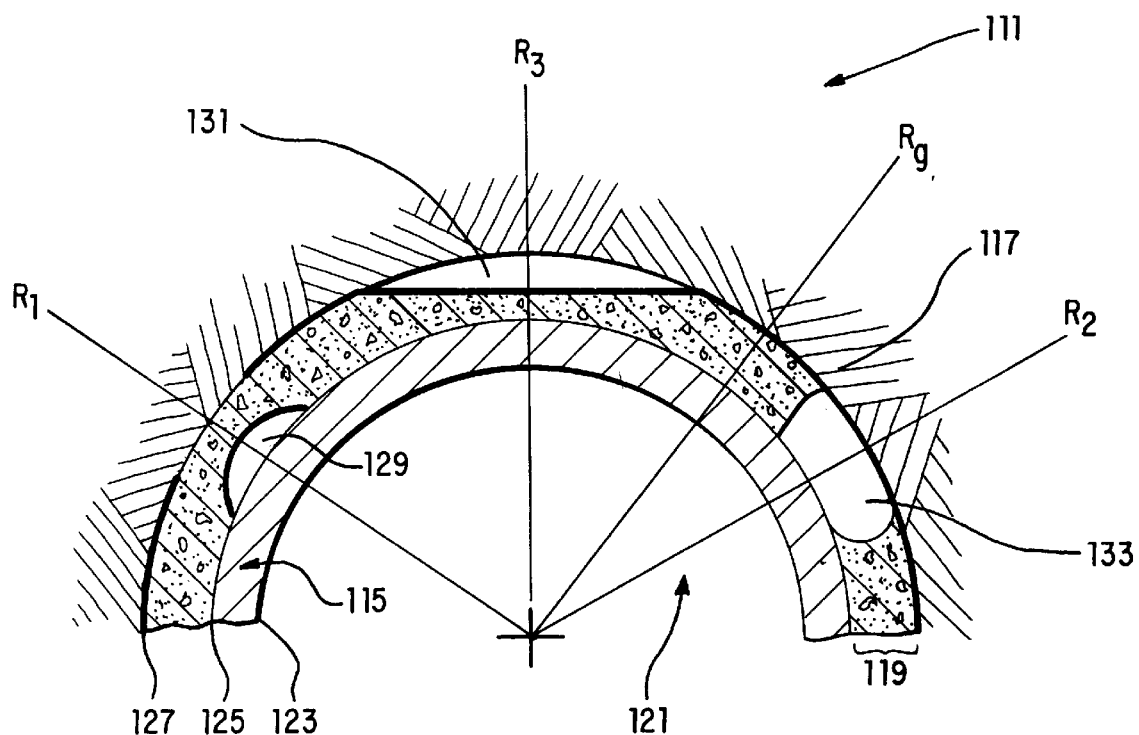
FIG. 1 is a cross-sectional diagram of a completed borehole.

FIG. 1 is a cross-sectional diagram showing materials used in a completed borehole to achieve hydraulic isolation.

A borehole 111 is cased with a first material, typically steel pipe 115. Outside and adjacent first material 115 lies second material 119. Second material 119 is usually a fill material, commonly referred to as cement, which is pumped into the annulus between casing 115 and earth formation 117. The cement hydrates to retain casing 115 rigidly in position. More importantly, it completely fills the annulus between casing 115 and earth formation 117 sealing off the hydrocarbon strata from the other layers so that when casing 115 and the cement (second material 119) are subsequently perforated, the hydrocarbons enter directly into casing 115 and migration of fluids between adjacent formation layers is prevented. Fluid 121, usually in the form of mud, is pumped into borehole 111 to the inside of casing 115. This fluid 121 maintains equilibrium in borehole 111 so that pressures exerted by formation 117 do not cause borehole 111 to cave in or blow out.

In accordance with the above description of borehole 111, a number of interfaces are formed between the various materials. The first interface 123 exists along the juncture between fluid 121 (usually mud) and casing 115. Ideally, second material 119 in the form of cement completely fills the space between casing 115 and earth formation 117. Such a situation is shown along radial line $R_g$. A second interface 125 is formed between casing 115 and cement and a third interface 127 emphasized by the bold line, exists at the juncture of cement and earth formation 117. Unfortunately, fill material or cement does not always completely fill the space between casing 115 and earth formation 117.

When cement does not completely fill the space, three possible conditions arise. The first condition is shown along radial line $R_1$. A near channel 129 exists between casing 115 and cement. Instead of second interface 125 existing between casing 115 and cement, it is formed between casing 115 and the fluid of near channel 129. In such a situation, the fluid of near channel 129 is second material 119. Additionally, instead of third interface 127 existing between cement and earth formation 117, it is formed at the juncture of a fluid (second material 119) and cement. Another type of near channel is shown along radial line $R_2$. This near channel is known as a full channel 133 because fluid extends completely across the annulus to earth formation 117. As in the case of near channel 129, full channel 133 also has a second interface between first material 115 and a fluid (second material 119). However, the third interface for full channel 133 is between a fluid and earth formation 117.

The third condition occurs when a channel is formed in the space between second material 119 and earth formation 117, i.e. a channel that does not contact first material 115. This condition is shown along radial line $R_3$ and is referred to as a buried channel 131. For such a channel, second interface 125 is formed between casing 115 and second material 119 (cement), and third interface 127 is formed at the juncture of second material 119 and the fluid of buried channel 131.

Figure 2:
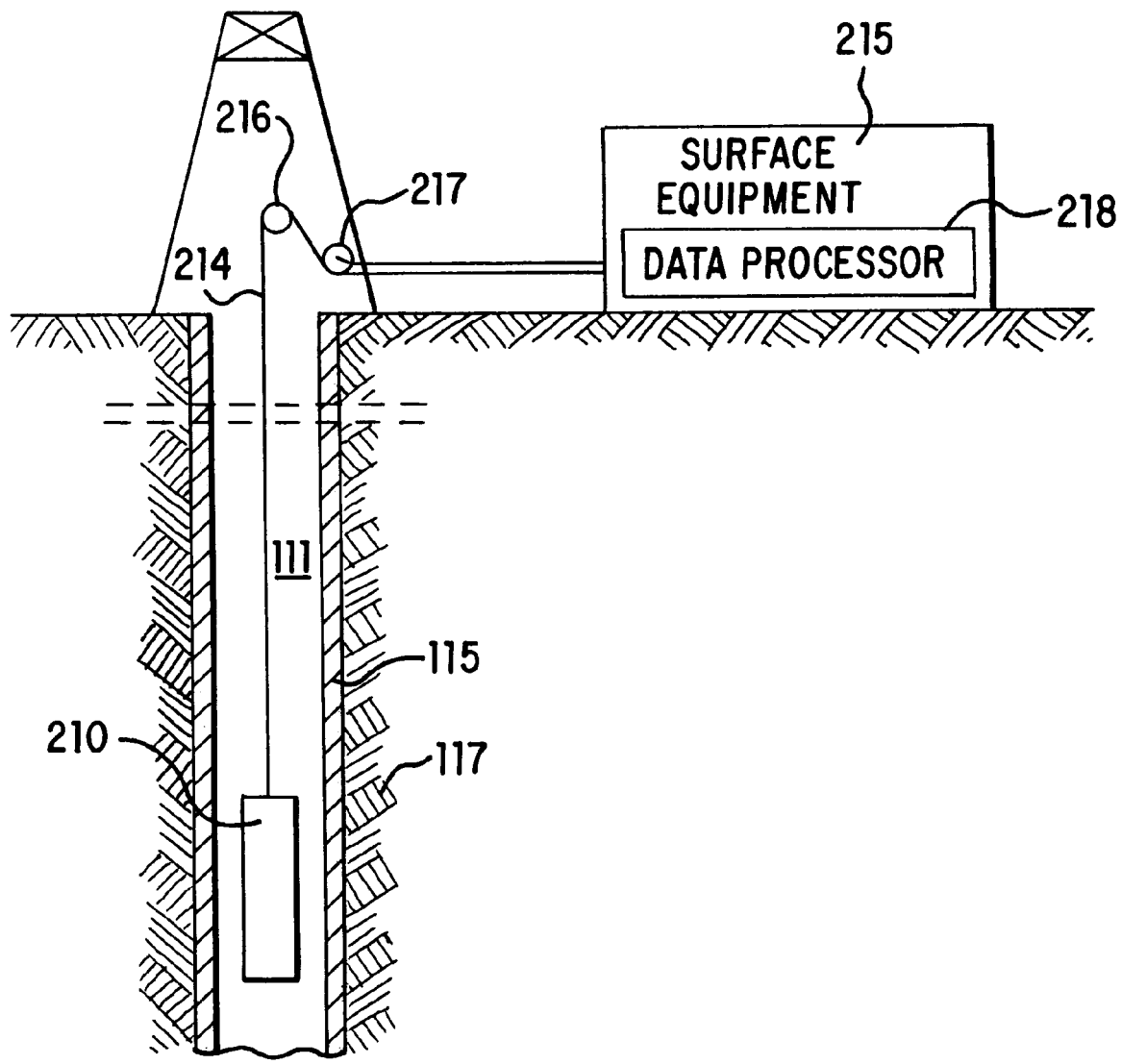
FIG. 2 is a schematic diagram of a logging operation.

FIG. 2 is a schematic diagram of a logging operation. Tool or sonde 210 for acquiring acoustic data is located in borehole 111 penetrating earth formation 117. Sonde 210 is preferably lowered in the borehole by armored multiconductor cable 214 and slowly raised by surface equipment 215 over sheave wheel 216 while data measurements are recorded. The depth of the tool is measured by depth gauge 217 which measures cable displacement.

Sonde 210 acquires acoustic data by emitting an acoustic pulse and detecting its return waveform. The sonde comprises at least one source or transmitter and at least one detector or receiver. The transmitter produces a pulse upon excitation. The pulse is directed into casing 115 and a resulting signal is detected by the receiver. The return waveforms can be analyzed by the sonde in situ, analyzed by data processor 218 at the surface, or stored, either in the sonde or at the site for analysis at a remote location.

Figure 3A:
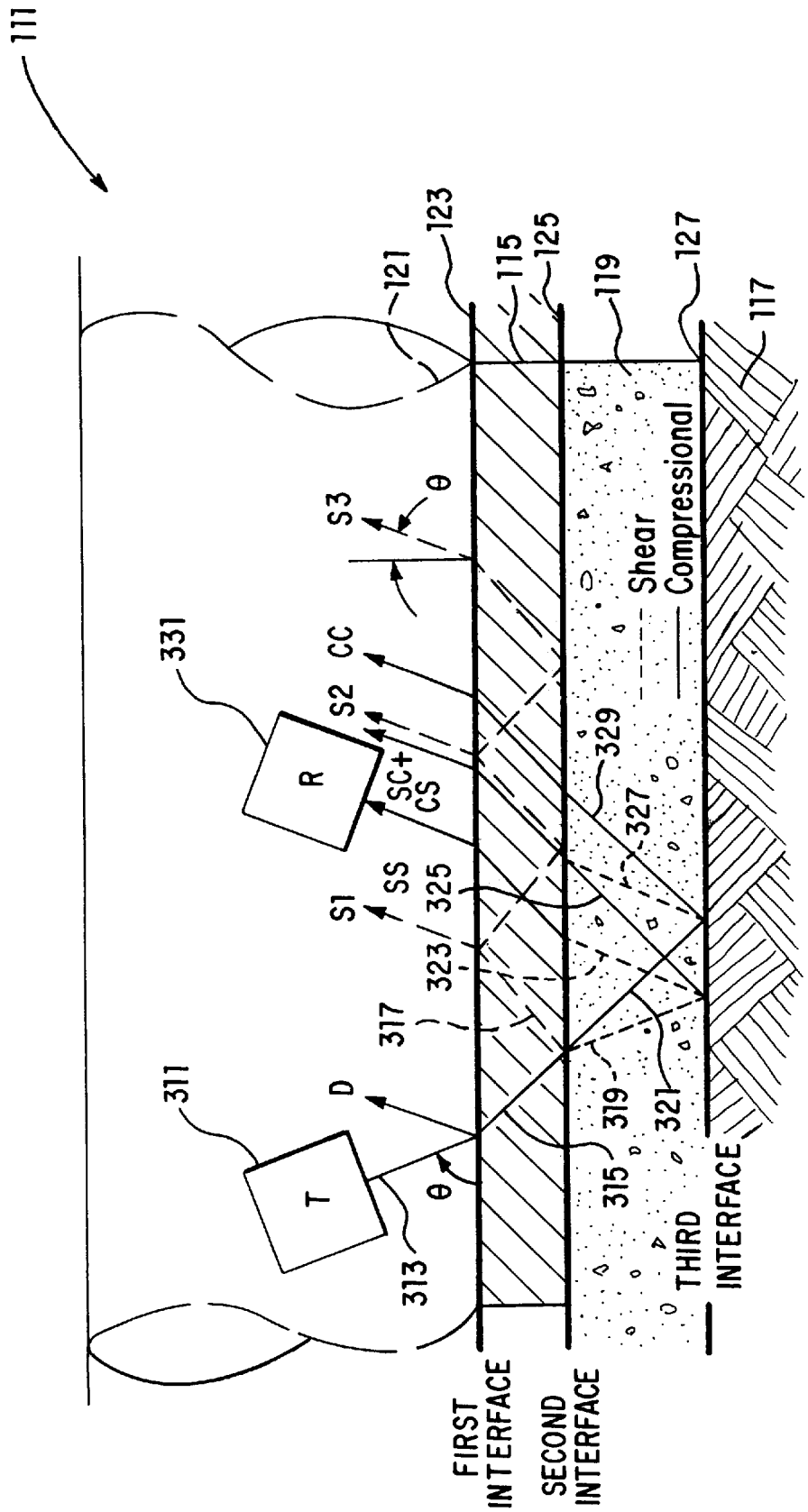
FIGS. 3A and B illustrate a transmitter and a receiver along with the various components of an acoustic signal directed from the transmitter into the wall of the borehole.

FIGS. 3A and B are illustrations of a transmitter 311 and a receiver 331, mounted in the housing of sonde 210. Transmitter 311 and receiver 331 are transducers capable of either transmitting or receiving acoustic energy. Preferably, at least one of the transducers is of the type for operating with acoustic energy which propagates in the form of a beam. If transmitter 311 is of a beam-type, receiver 331 may or may not be a beam-type transducer. The reason for this is that acoustic energy transmitted by transmitter 311 in the form of a beam will arrive at receiver 331 in the form of a beam provided receiver 311 is located in the appropriate position. Alternatively, if transmitter 311 is a point source, as long as receiver 331 is a beam-type and is positioned appropriately, it will detect a beam of acoustic energy which has traveled along a path of interest. Of course, if both transmitter 311 and receiver 331 are beam-type transducers, the apparatus will function in accordance with the invention.

The various paths of components of an acoustic signal detected at receiver 331 are also shown in FIGS. 3A and B. Transmitter 311 transmits a pulse of acoustic energy 313. When transmitter 311 transmits acoustic energy 313 in the form of a beam it does so at a selected transmission angle t to first interface 123 with a width roughly the same as transmitter 311. When pulse 313 strikes casing 115, some of the energy D is reflected while the remainder continues into casing 115. Transmission angle t is selected such that the shear energy continuing into casing 115, does so at a well-defined angle θ from first interface 123. Preferably, angle t is between the compressional critical angle and the shear critical angle for casing 115, providing a strong shear component transmitted into casing 115 while providing no substantial compressional component. Any compressional component which does enter casing 115 travels substantially parallel to the casing interfaces within casing 115.

In FIG. 3A, shear component 315 passes through casing 115 and strikes second interface 125 at the back of casing 115. A portion of its energy 317 is reflected while the remainder is transmitted into second material 119. If second material 119 is cement, the remaining portion of shear component 315 is split into two cement components. The first cement component is a shear component 319. The second cement component is a compressional component 321. Each of these components propagates across the cement and is partially reflected at third interface 127. At this point, each component is again split into two reflected components referred to as Third Interface Echoes (TIE's) which propagate back towards casing 115. Upon reflection from third interface 127, shear component 319 is split into a reflective shear-shear component 323 and a reflective shear-compressional component 325. Additionally, compressional component 321 is split into a compressional-shear component 327 and a compressional-compressional component 329 upon reflection from third interface 127.

Each of the four TIE's 323, 325, 327, and 329 propagate back through second material 119 to second interface 125. Upon reaching second interface 125, the four TIE's continue through casing 115 exiting at first interface 123 into fluid 121. A receiver 331, positioned and angled properly in borehole 111, detects one or more of the components as they propagate through fluid 121. The above description applies to the situation where transmitter 311 transmits a beam of acoustic energy which is received by either a point-source receiver or a beam-type receiver. In the case where transmitter 311 is a point-source transducer, receiver 331 is a beam-type transducer which receives only energy which has traveled along a predetermined predicted path.

The four TIE's are each an individual component of the original acoustic energy signal directed into casing 115: The first TEE is shear-shear component 323 of pulse 313 and it is labeled SS; the second TIE is the shear-compressional component 325 of pulse 313 and it is labeled SC; a third TIE is compressional-shear component 327 labeled CS; and the fourth TIE is compressional-compressional component 329 labeled CC. For each of the labels, the first letter indicates the polarization (shear or compressional) on the trip from the second to the third interface, while the second letter indicates the polarization of the trip back from the third interface to the second. Upon receiving TIE's 323–329, processing is performed to characterize the materials in the borehole as a function of the path of the acoustic energy originally introduced at the front surface of casing 115. Given that parameters such as casing thickness, standoff (distance between transducers and first interface) and offset (distance between transducers) positions of transducers 311 and 331, and the properties of fluid 121 and second material 119 are known, the thickness of second material 119 is determined from the travel time of the TIE's. Additionally, properties of the formation are characterized from the amplitude and polarity of the TIE's.

The processing must take into account certain "casing" signals which exist upon transmitting acoustic energy 313 from transducer 311 and which are detected at receiver 331. A majority of acoustic energy 313 emitted from transmitter 311 is reflected at first interface 123 before it ever enters casing 115. This energy is shown as direct reflection D. The remaining portion enters casing 115 preferably at angle θ which is less than the compressional critical angle allowing only shear energy 315 to propagate through first material 115. The dominant casing signals which reverberate in casing 115 never propagate beyond second interface 125. They are reflected back into casing 115 at second interface 125. This reflected energy travels through casing 115 reaching first interface 123 where a portion of it forms casing echo S1. The remainder reflects back into casing 115 to repeat the cycle, creating casing echoes S2, S3 . . . , etc.

The operation of transducers 313 and 331 to transmit acoustic energy into casing 115 at at angle θ spatially spreads arrival D and casing echoes S1, S2, S3, etc., away from transmitter 311, along casing 115. Properly positioned, receiver 331 receives portions of a limited number of casing echoes S1, S2, S3 etc. but not all of the casing echoes. In FIG. 3, receiver 331 is shown receiving S1 and S2, but not S3, S4, etc. The components of interest, namely the TIE's arrive between S1 and S2 and are detected by receiver 331 as shown in FIG. 3. These components are analyzed without interpreting or subtracting the later casing reverberations produced upon continued reflections between first interface 123 and second interface 125 and which arrive outside the range of reception for receiver 331.

Figure 3B:
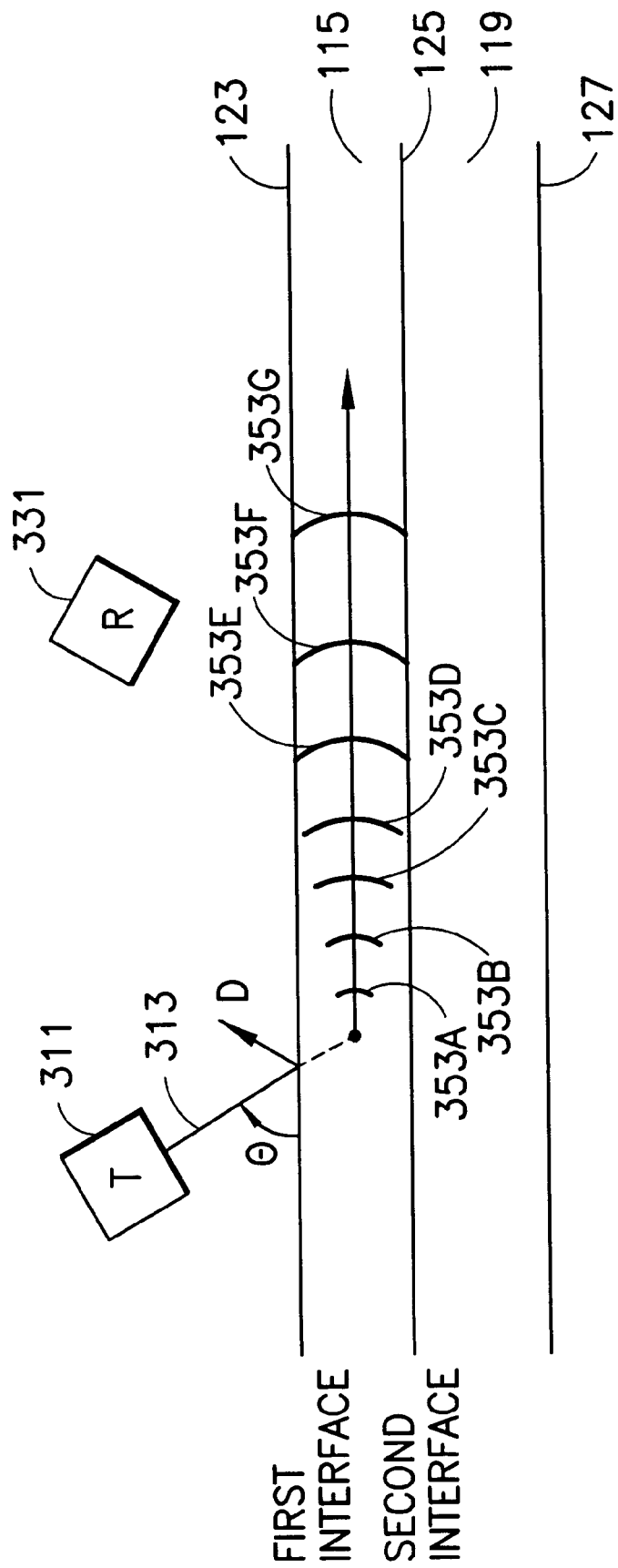

FIG. 3B illustrates a compressional portion or wave resulting from original acoustic energy 313, and is indicated by the series of waves 353. Angle t is chosen to provide no substantial compressional component within casing 115. However, as can be seen from this Figure, the compressional portion 353 which does enter casing 115, travels substantially parallel to interfaces 123 within casing 115 and does not reach receiver 331.

FIG. 4 is an illustration of waveforms received from two different third interface conditions. Each waveform includes several separate echo arrivals whose labels correspond to those described with reference to FIG. 3A. As can be clearly seen in FIG. 4, the TIE's are separate in time from the casing echo arrivals. In each case, three of the TIE's are visible. CC 329 has a naturally low amplitude due to low transmission coefficients. Further, it is concentrated beyond the range of receiver 331 and is not distinguishable in either waveform. SC 325 and CS 327 occur at the same time and place and are superimposed and indistinguishable. This is the case when the thickness of second material 119 is locally uniform, as it is in FIG. 4. In each case SC+CS is larger than SS 323 for two reasons: First, it is composed of two arrivals; and second, there is less compressional attenuation than shear attenuation in second material 119.

The first waveform $W_1$ corresponds to the situation where buried channel 131 exists adjacent to and outside second material 119 as shown in the corresponding borehole configuration diagram to the right of waveform $W_1$. Waveform $W_2$ represents data taken when there is no buried channel; a third interface 127 exists at the juncture between second material 119 and earth formation 117.

Three factors for a particular TIE, e.g., SC+CS, are considered in characterizing the composition of the second material and, in turn, third interface 127. The first factor is delay. Delay provides an indication of the time it takes for an echo to travel through the second material. Therefore, it represents the thickness of the second material.

The shorter the distance an echo travels, the sooner it will arrive at receiver 331. For $W_1$, each of the TIE's is sooner than in the case of $W_2$. The reason for the earlier arrivals in waveform $W_1$ is due to the existence of buried channel 131. The thickness of buried channel 131 between second material 119 and earth formation 117 causes third interface 127 to be closer to casing 115 for waveform $W_1$.

Whereas the first factor, delay of the particular received TIE indicates the distance to third interface 127, the second and third factors provide information related to material properties. The second factor, polarity of a TIE, indicates whether buried channel 131 exists by determining the relative impedance of the materials present along the third interface. A reflection coefficient is computed for third interface 127. The reflection coefficient as calculated is a function of the impedances of the second material and third material as well as other trigonometric functions dependent on the transmission and reflection angles. However, for simplicity, the reflection coefficient may be approximated by the same equations that are used to calculate the reflection coefficient of a signal transmitted at normal incidence:

$$R_3 = \frac{Z_3 - Z_2}{Z_3 + Z_2} \tag{1}$$

$$Z_n = V_n \rho_n \tag{2}$$

where $R_3$ is the reflection coefficient at the third interface; and $Z_n$ is the impedance of the nth material.

and $V_n$ is the velocity of a wave through the nth material; and $\rho_n$ is the density of the nth material.

An examination of equation (1) reveals that the sign (polarity) of the reflection coefficient is positive (+) when the third material has a higher impedance than the second material. The sign (polarity) is negative (−) when the opposite is true.

Typically, cement impedance is higher than that of a gas or undisplaced mud and lower than that of rock. Therefore, when a buried channel is present between the cement and the earth formation, the polarity of the reflection coefficient of the third interface is opposite in sign as compared to that of a third interface where no buried channel exists. In fact, component SC+CS of waveform $W_1$ and component SC+CS of waveform $W_2$ have visibly opposite polarities. As a result, the TIE polarities distinguish a formation echo from a buried channel echo. Table 1 below shows the possible interpretations when second material 119 is cement.

TABLE 1

| Second Material | Third Material | Sign | Characterization |
|---|---|---|---|
| cement | mud | − | Buried channel |
| cement | high impedance formation | + | Effective isolation |
| cement | low impedance formation | − | False negative isolation |

As can be seen from Table 1, earth formation having an acoustic impedance lower than the cement, e.g. very soft rock, is problematic. This is because it gives a "false negative isolation" characterization. However, since the problem is recognized, it can be anticipated by considering other borehole environment characteristics as measured.

The third factor used to characterize the third interface is the amplitude of the TIE. The amplitude of component SC+CS indicates the relative impedances and attenuation coefficients of the different materials.

Computation of amplitude is performed in accordance with the following equation:

$$A = |\eta e^{-\alpha_0 l_0} T_1 e^{-\alpha_1 l_1} T_2 e^{-\alpha_2 l_2} R_3| \qquad (3)$$

where, A is the amplitude of the spectral representation of a TIE;

$\eta$ is the product of the efficiencies of the transmitter and receiver operating in the borehole fluid, and associated electronics;

$\alpha_0$ is the attenuation coefficient in the borehole fluid;

$l_0$ is the combined propagation length in the borehole fluid, from the transmitter to the casing and from the casing to the receiver, along the TIE's path;

$T_1$ is the product of the transmission coefficients for the TIE as it passes through the first interface in both directions from the borehole into the casing and from the casing into the borehole;

$\alpha_1$ is the attenuation coefficient in the casing;

$l_1$ is the combined propagation length through the casing in both directions along the TIE's path;

$T_2$ is the product of the transmission coefficients for the TIE as it passes through the second interface in both directions from the casing into the annulus, and from the annulus into the casing;

$\alpha_2$ is the attenuation coefficient in the annulus;

$l_2$ is the combined propagation length through the annulus in both directions along the TIE's path;

$R_3$ is the reflection coefficient from the third interface for the TIE;

A, $\eta$, and the $\alpha_s$ are all functions of frequency; and $T_1$, $T_2$, and $R_3$ are all functions of the compressional and shear velocities, the densities, and the path's angles in the media, as one skilled in the art will recognize.

For example, if the properties of the tool, the borehole fluid, the casing, and the cement are known, then the reflection coefficient from the third interface $R_3$ can be calculated. If the third interface is the boundary between the cement and formation, $R_3$ contains information about the formation.

To properly configure transmitter 311 and receiver 331 to maximize the sensitivity of the detected signal to the desired interface and minimize the sensitivity to unwanted reflections, e.g. measuring third-interface reflections separated from casing reverberations, a number of parameters must be considered. The transmission and reception angles, the transducer spacing, and the distances from the casing depend on such transducer parameters as angular spectrum, beamwidth, and bandwidth. Also, considerations of the local area of investigation include cement and casing dimensions and acoustic properties, as well as the acoustic properties of the borehole fluid. Many of these parameters depend on one another making optimization of transducer configuration complex.

Figure 6A:
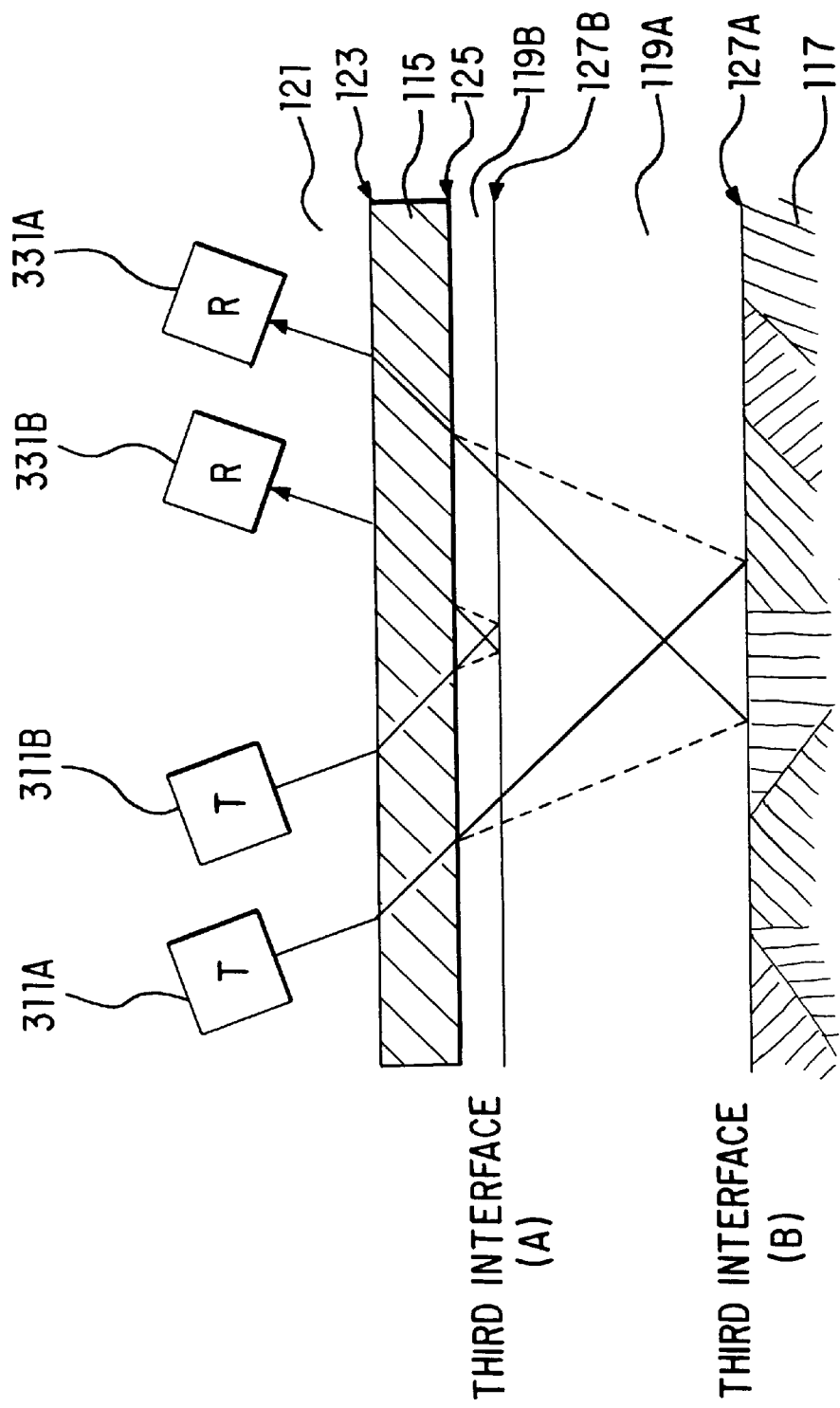
FIGS. 6A–6C are illustrations of various embodiments of an apparatus for interrogating the interfaces in a borehole.

If second material 119 occupies a thick annular space between casing 115 and earth formation 117, the desired TIE may miss a single receiver placed at a particular distance from a single transmitter. One possible solution which anticipates this problem is to alter the relative position of receiver 331 with respect to transmitter 311 based on information obtained by probing the borehole wall. An alternative approach is shown in FIG. 6A. A wider range of coverage is achieved for varying annular thicknesses by employing a group of transmitter-receiver pairs. Preferably, each corresponding pair has a common center point to facilitate processing. Receiver 331A detects TIEs from third interface 127A and originally transmitted by transmitter 311A. Similarly, receiver 331B detects TIEs from third interface 127B and originally transmitted from transmitter 311B. For each transmitter-receiver pair, the spacing is set to capture a time window during which the third interface echoes are expected as calculated for that particular distance range. Detection of a third interface echo with closely spaced pair 311B–331B functions well for formations where the second material is relatively thin. However, this same pair would miss a signal reflected in a formation with a thick second material. Therefore, a wider spaced pair, 311A–331A, is configured with the transducers farther apart. In the embodiment of FIG. 6A, each of transmitters 311 and receivers 331 are located at an equal distance from first interface 123.

Figure 6B:
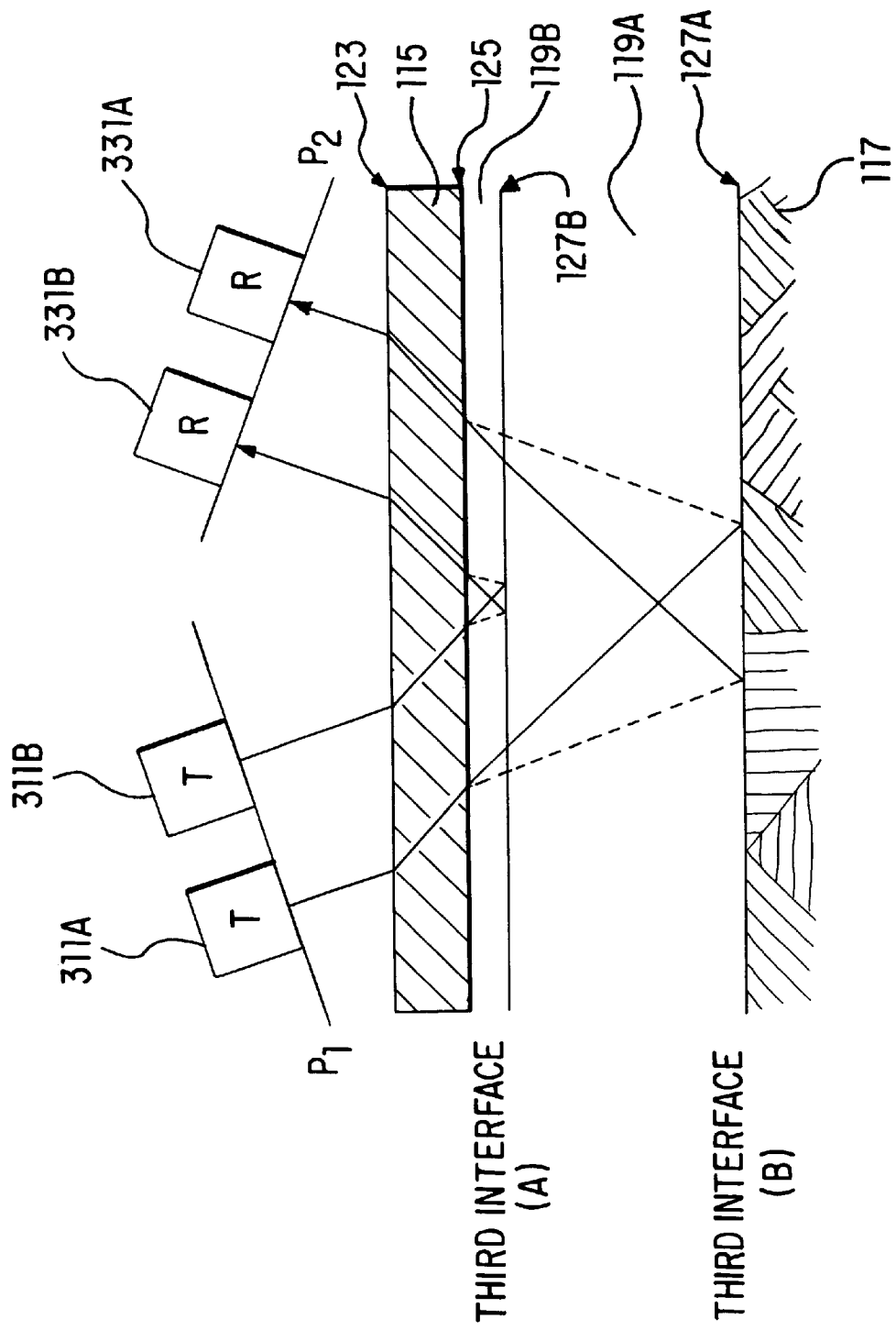
Figure 6C:
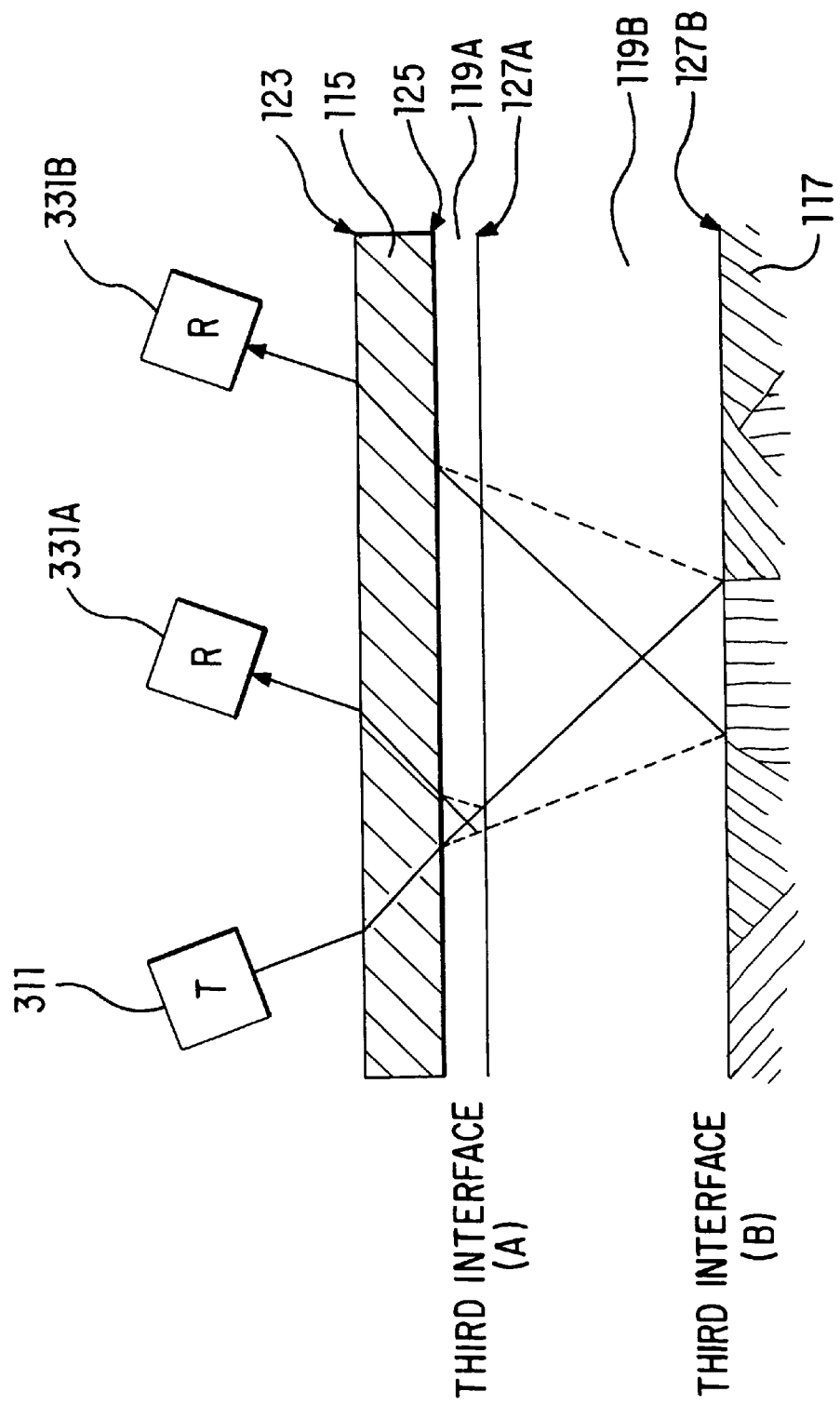

In an alternative embodiment, shown in FIG. 6B, transmitters 311 are shifted so that the faces of the transmitters lie in a single plane $P_1$. In addition, the faces of the receivers 331 are aligned on a single plane $P_2$. The advantage of situating transmitters 311 along plane $P_1$ and receivers 331 along plane $P_2$, angled equal but opposite to plane $P_1$, is to simplify construction and reduce attenuation in the mud for signals which penetrate deeper into the annulus A third alternative is to use a single transmitter 311 with multiple receivers 331. Such a configuration is shown in FIG. 6C. This configuration gains the advantage of a reduced number of transmitters thereby reducing cost. Of course, a single receiver with multiple transmitters would work equally well.

Other configurations may include systems with more than two transmitters and more than two receivers. In addition, the configuration of FIG. 6C may be altered so that receivers 331 are situated along plane $P_2$, as in FIG. 6B. Or, multiple transmitters situated along a single plane can be spaced apart from a single receiver. Finally, all transmitters 311 and receivers 331 in the aforementioned configurations can be simulated by one or more phased, delayed, or linear array transducers. In addition to the flexibility of arrays to adapt to various geometries, the arrays allow more control over the apodization of the beams. This is important for maintaining a narrow beam and a narrow angular spectrum. Beam width and angular spectrum are also controlled by transducers which are focused in a variety of geometric configurations, such as conical, spherical, cylindrical, bicylindrical, concave and convex. In the configurations shown in the figures, identical transducers are used for the transmitters and receivers. However, this need not be the case as the angular spectra of each can be chosen independently to achieve an overall angular spectrum. These transducers may be immersion-type, electromagnetic acoustic, or other known transducer formats.

Figure 7:
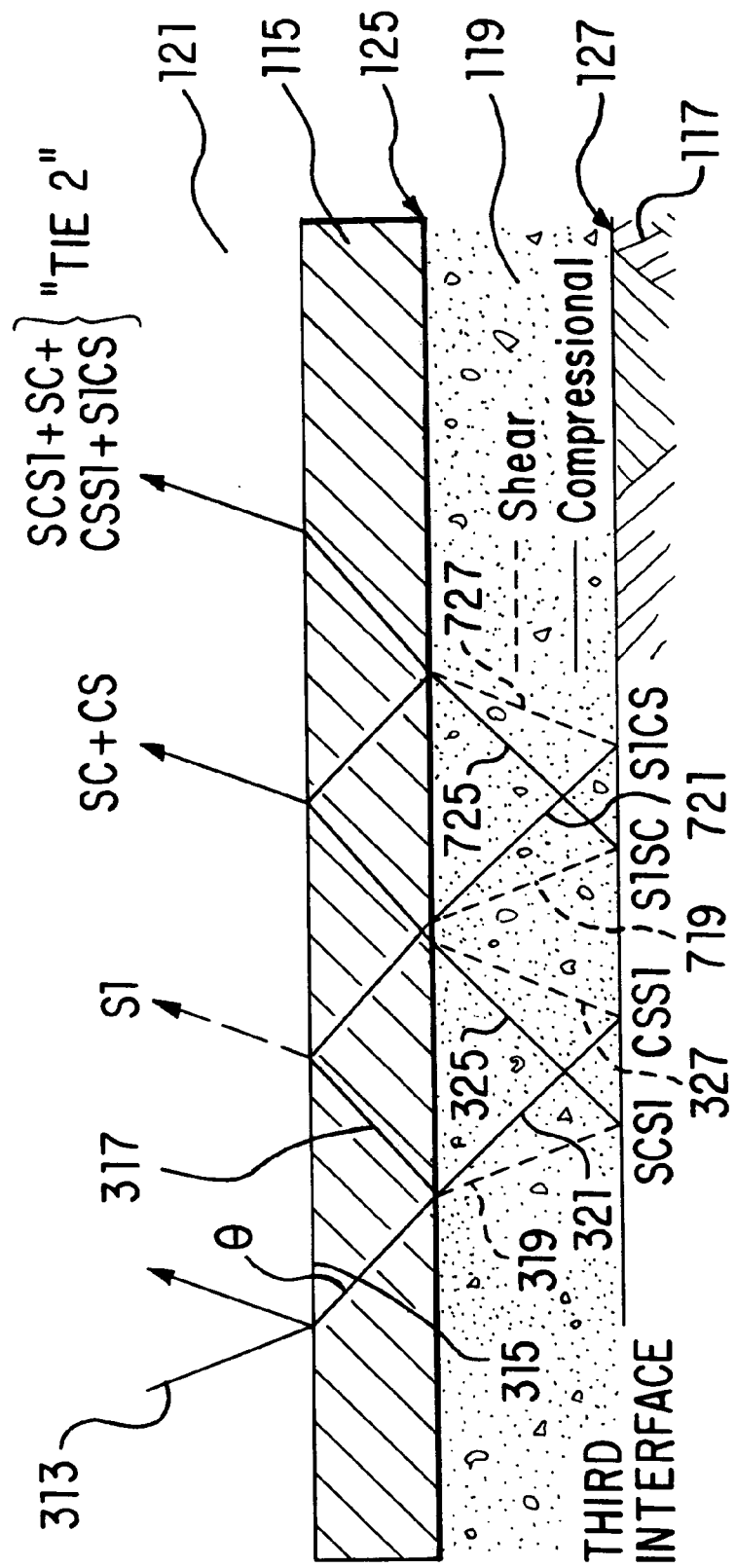
FIG. 7 is an illustration of the first and second order, compressional and shear signals propagating in the different media in the borehole.

FIG. 7 illustrates higher order TIE's which may have potential interest for hydraulic isolation determination. These higher order TIE's are later reverberations of originally transmitted pulse 313 (i.e., casing signals S1, S2, S3, etc.) which produce components similar to components 323–329 of FIG. 3. For example, reverberation S1 produces the following components in second material 119: S1SC 725 and S1CS 727. These two components are reflections from third interface 127 of shear component 719 and compressional component 721 respectively. Components SS and CC are not shown here since they are not as easily detected as arrival SC+CS 731 which propagates back through casing 115 to receiver 331 (not shown). However, SS and CC may be used. The higher order TIE's have larger amplitudes than the first order TIE's and appear at different offsets and delays. Therefore, they are easier to detect and record. However, the disadvantage of using higher order TIE's is that they interrogate more widely separated points on third interface 127 and may suffer greater degradation of resolution and signal reduction.

If the annulus between casing 115 and earth formation 117 contains fluid, only one first order TIE occurs, the compressional-compressional component 329. This is because fluids support only compressional waves. The angles and times associated with compressional-compressional component 329 in a fluid-filled annulus are quite similar to those of the shear component 323 in an annulus filled with cement 119. The previous knowledge of the phase of second material 119 against casing 115 aids in interpreting hydraulic isolation determination results. This information is acquired beforehand using standard UCE or from an interpretation of the casing reverberations S1, S2, S3, etc.

First material reverberations S1, S2, S3, etc. are all discrete signal components which have interacted, at least once, with both interfaces of the casing. The energy making up S1 travels through first interface 123 from borehole fluid 121. It then follows a path through first material 115 reflecting off second interface 125. It again crosses first material 115 as it follows a path back to first interface 123. The time delay of the arrival of S1, as a result of this travel path, along with the knowledge of some relevant velocities and angles, provides a means of calculating the casing thickness. Also, since S1 has reflected from second interface 125, its amplitude is somewhat dependent on the acoustic impedance of second material 119. Analysis of S1 could provide an indicator of whether second material 119 is a fluid or cement. Analysis for casing thickness or for second material 119 may alternatively be performed using later casing echoes or some combination of casing echoes.

Figure 8:
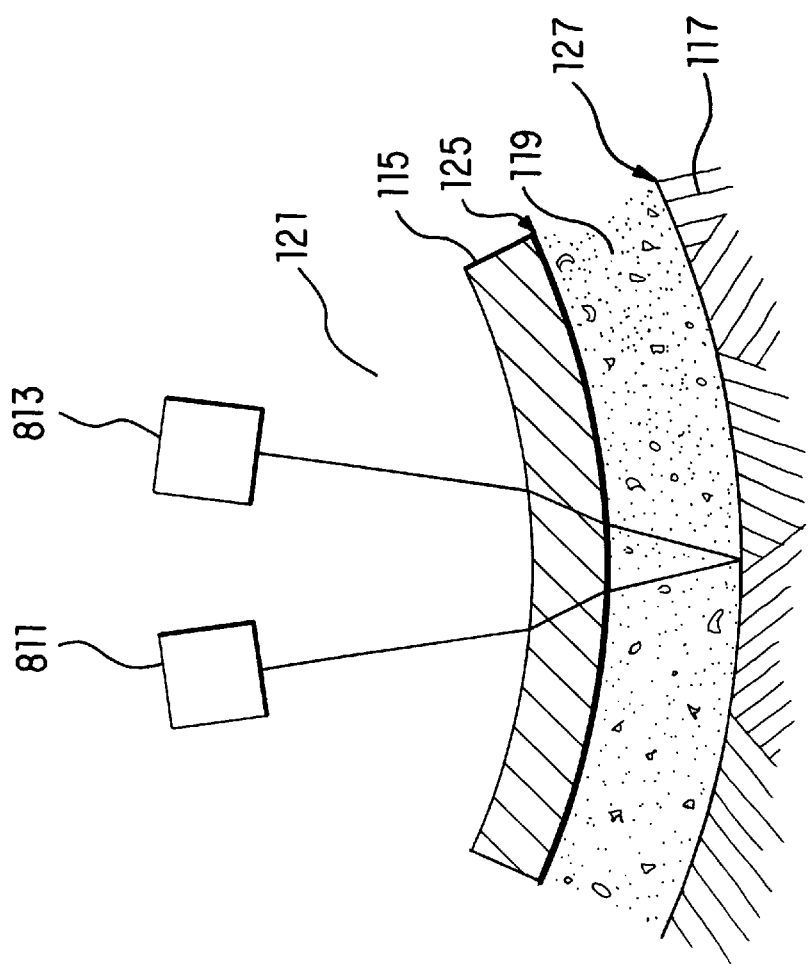
FIG. 8 is an illustration of an alternative embodiment of a hydraulic solation determination apparatus.

FIGS. 3, 4, and 6 illustrate embodiments of the present invention where the transducers are configured to transmit and receive signals along an axial portion of the borehole wall. In FIG. 8, an alternative embodiment is illustrated. Transducers are configured to transmit and receive signals along a circumferential portion of the borehole wall. In this configuration, a signal is transmitted from transmitter 811 into casing 115. Resulting signals from the various interfaces are received by receiver 813. As can be seen from FIG. 8, the angles the signal encounters as it passes through casing 115 and second material 119 and its reflection from the different interfaces is markedly different from those shown in the previous configurations due to the curvature of the borehole wall. The configuration of FIG. 8 makes it easier to assess the effect of out-of-plane rays.

The hydraulic isolation determination of the present invention is valuable for two applications in addition to the interrogation of a completed borehole. First, it is useful before fill material is placed in the annulus. This is advantageous because it permits determination of the geometry of the annulus for computing the required volume of cement and provides a baseline for aiding later interpretation. Another advantage obtained by using the invention before cement is pumped into the annulus is the detection of the casing location with respect to the formation. Second, the present invention permits information to be obtained after placement of the fill material and before hydration. The results obtained from these measurements are valuable for hydraulic isolation determination after hydration.

In conclusion, the present invention provides new and improved techniques for evaluating and characterizing fill material in the annulus between a casing and an earth formation in a borehole, as well as for determining the casing thickness. While the above is a complete description of the preferred embodiment of the invention, various alternatives, modifications, and equivalents may be used. For example, there is a trade-off between excluding unwanted echoes with a narrower angular spectrum and including wanted echoes with a wider angular spectrum. Therefore, excitation and detection of a carefully chosen and well-defined range of angles is essential. This is achieved by using focused transducers or by choosing the width and bandwidth of the transducer to allow significant diffraction. A number of transducers may affect the desired results including concave spherically-focused transducers, convex, cylindrical, bicylindrical, sonic and electronically focused. Additionally, in the configurations shown in the figures, identical transducers are used for the transmitters and receivers. However, this need not be the case as the angular spectra of each can be chosen independently to achieve an overall angular spectrum. Further, an infinite number of permutations and combinations of the described embodiments are possible including transmitter and receiver assemblies which are neither axially or circumferentially aligned.

Another aspect of the invention is its applicability to borehole measurements before hydration of fill material in the annulus between the casing and the earth formation. Such information may be useful for a number of applications. Therefore, the above description should not be taken as limiting the scope of the invention which is defined by the appended claims.

What is claimed is:

1. An apparatus for interrogating a cased borehole environment to determine properties of materials present in the borehole, comprising:

a housing;

a means for establishing a reflective path comprising a transmission means and a receiving means between which reflected acoustic energy travels;

13 a) the transmission means mounted in the housing for transmitting acoustic energy in a beam of substantially constant width at a predetermined initial angle to a first interface between the borehole and a casing in the borehole, the predetermined initial angle comprising an intercritical angle between a compressional critical angle of the casing and a shear critical angle of the casing for producing acoustic energy such that the beam of acoustic energy is substantially separated into:

i) a shear portion of the acoustic energy which travels in a beam into the casing along the reflective path and encounters at least one of a second interface between the casing and a material in the borehole and a third interface between the material and a formation surrounding the borehole, and wherein the shear portion of the acoustic energy reflects from at least one of the second interface and the third interface back through the casing; and ii) any compressional portion of the acoustic energy which enters the casing travels in a direction substantially parallel to the first interface along the casing;

b) the receiving means mounted in the housing at a predetermined distance from the transmission means for detecting components of the shear portion which have travelled along a reflective path off at least one of the second interface and the third interface and back through the casing, and which arrive at the first interface propagating at an angle corresponding to the intercritical angle; and processing means for processing components of the shear portion of the beam of acoustic energy detected by the receiving means and for generating data determinative of the reflective path to and from at least one of the second interface and the third interface along which the shear portion has travelled, the data being representative of properties of the materials in the borehole between the casing and the formation.

2. The apparatus of claim 1 wherein the properties of the materials represented by the data include thickness of materials in the borehole.

3. The apparatus of claim 1 wherein the properties of the materials represented by the data include impedance of materials in the borehole.

4. The apparatus of claim 1 wherein the receiver means comprises a plurality of receivers each positioned at a predetermined distance from the transmission means to detect the shear portion as a function of a particular thickness of the second material.

5. The apparatus of claim 1 wherein the transmission means comprises a plurality of transmitters spaced at predetermined distances from each other.

6. The apparatus of claim 1 wherein the transmission means and the receiver means are axially aligned along a portion of the housing.

7. The apparatus of claim 1 wherein the transmission means and the receiver means are circumferentially aligned along a portion of the housing.

8. An apparatus for interrogating a cased borehole environment to determine properties of materials present in the borehole, comprising:

a housing;

a means for establishing a reflective path comprising a transmission means and a receiving means between which reflected acoustic energy travels;

a) the transmission means mounted in the housing for introducing acoustic energy into a casing in the

14 borehole at a predetermined initial angle to a first interface between the borehole and the casing in the borehole;

b) the receiving means mounted in the housing a predetermined distance from the transmission means, the receiving means operating to receive acoustic energy in a beam of substantially constant width, a shear portion of the acoustic energy having travelled as a beam in the casing along the reflective path and arriving at the first interface propagating at an angle corresponding to the predetermined initial angle, the predetermined initial angle comprising an intercritical angle between a compressional critical angle of the casing and a shear critical angle of the casing for producing acoustic energy such that:

i) the shear portion of the beam travels the reflective path which includes at least one of a second interface between the casing and a material in the borehole and a third interface between the material and a formation surrounding the borehole, wherein the shear portion of the acoustic energy reflects from at least one of the second interface and the third interface back through the casing;

ii) any compressional portion of the acoustic energy which enters the casing travels another path in a direction substantially parallel to the first interface along the casing; and processing means for processing components of the shear portion of the beam of acoustic energy detected by the receiving means and for generating data determinative of the reflective path to and from at least one of the second interface and the third interface along which the shear portion has travelled, the data being representative of properties of the materials in the borehole between the casing and the formation from the acoustic energy detected by the receiving means.

9. The apparatus of claim 8 wherein the properties of the materials represented by the data include thickness of materials in the borehole.

10. The apparatus of claim 8 wherein the properties of the materials represented by the data include impedance of materials in the borehole.

11. The apparatus of claim 8 wherein the receiver means comprises a plurality of receivers each positioned at a predetermined distance from the transmission means to detect the shear portion as a function of a particular width of the second material.

12. The apparatus of claim 8 wherein the transmission means comprises a plurality of transmitters spaced at predetermined distances from each other.

13. The apparatus of claim 8 wherein the transmission means and the receiver means are axially aligned along a portion of the housing.

14. The apparatus of claim 8 wherein the transmission means and the receiver means are circumferentially aligned along a portion of the housing.

15. A method of interrogating a cased borehole environment to determine properties of materials present in the borehole, comprising;

establishing a reflective path between first and second positions in the borehole by:

(a) introducing a beam of acoustic energy of substantially constant width into a casing in a borehole from the first position in the borehole, a shear portion of the acoustic energy propagating into and through the casing at a predetermined initial angle to a first interface between the borehole and the casing in the borehole, the predetermined initial angle being selected such that:
i) the shear portion encounters at least one of a second interface between the casing and a material in the borehole and a third interface between the material and a formation surrounding the borehole; and
ii) any compressional portion of the acoustic energy which travels in the casing in a direction substantially parallel to the first interface;
(b) reflecting or transmitting at least one component of the shear portion along the corresponding reflective path upon encountering a second interface and at least one of the first interface, the second interface, and a third interface; and
(c) receiving at the second position in the borehole at least one component of the shear portion having reflected off at least one of the second interface and third interface, the second position being a predetermined distance from the first position, once the at least one component completes the reflective path; and generating data determinative of the reflective path and representative of properties of the materials in the borehole between the casing and the formation from the at least one component detected of the reflected shear portion.

16. The method of claim 15 wherein steps (a)–(d) are performed before cement is pumped into an annulus between the first material and a formation.

17. The method of claim 15 wherein steps (a)–(d) are performed after cement is pumped into an annulus between the first material and a formation and before hydration of the cement occurs.

18. The method of claim 15 wherein steps (a)–(d) are performed after cement is pumped into an annulus between the first material and a formation and after hydration of the cement occurs.

19. The method of claim 15 further comprising the steps of:
(e) performing steps (a)–(d) before cement is pumped into an annulus between the first material and a formation;
(f) performing steps (a)–(d) after cement is pumped into an annulus between the first material and the formation and before hydration of the cement occurs;
(g) performing steps (a)–(d) after cement is pumped into an annulus between the first material and the formation and after hydration of the cement occurs; and
(h) comparing the results of at least two of steps (e)–(g) to determine quality of a bond formed between materials in the borehole.

20. The method of claim 15 wherein relative impedance data is generated in accordance with an associated reflection coefficient for a particular interface.

21. The method of claim 15 wherein impedance amplitude data is generated in accordance with the equation:

$$A = |\eta e^{-\alpha_0 l_0} T_1 e^{-\alpha_1 l_1} T_2 e^{-\alpha_2 l_2} R_3| \quad (3)$$

where, A is the amplitude of the spectral representation of a TIE (third interface echo);
$\eta$ is the product of the efficiencies of the transmitter and receiver operating in the borehole fluid, and associated electronics;
$\alpha_0$ is the attenuation coefficient in the borehole fluid;
$l_0$ is the combined propagation length in the borehole fluid, from the transmitter to the casing and from the casing to the receiver, along the TIE's path;

$T_1$ is the product of the transmission coefficients for the TIE as it passes through the first interface in both directions from the borehole into the casing and from the casing into the borehole;
$\alpha_1$ is the attenuation coefficient in the casing;
$l_1$ is the combined propagation length through the casing in both directions along the TIE's path;
$T_2$ is the product of the transmission coefficients for the TIE as it passes through the second interface in both directions from the casing into the annulus, and from the annulus into the casing;
$\alpha_2$ is the attenuation coefficient in the annulus;
$l_2$ is the combined propagation length through the annulus in both directions along the TIE's path;
$R_3$ is the reflection coefficient from the third interface for the TIE;
A, $\eta$, and the $\alpha_s$ are all functions of frequency; and
$T_1$, $T_2$, and $R_3$ are all functions of the compressional and shear velocities, the densities, and the path's angles in the media, as one skilled in the art will recognize.

22. An apparatus for determining characteristics of a third interface in a borehole penetrating an earth formation from a resulting signal derived from an acoustic investigation of the third interface with a beam acoustic pulse directed at a segment of a first material forming a casing in the borehole and selected to interrogate the third interface existing between a second material located beyond the casing and a third material located beyond the second material, comprising:
a housing;
a means for establishing a reflective path comprising a transmission means and a receiving means between which reflected acoustic energy travels;
a) the transmission means mounted in the housing at a first position for introducing the beam acoustic pulse having substantially constant width into the casing at a transmission angle less than 90 degrees to a first interface, the transmission angle being between a compressional critical angle of the casing and a shear critical angle of the casing such that:
i) a shear portion of the beam acoustic pulse encounters a second interface and a third interface in the borehole;
ii) the shear portion of the acoustic energy reflects from the third interface back through the second material and the casing; and
iii) any compressional portion of the beam acoustic pulse which enters the casing travels in a direction substantially parallel to the first interface;
b the receiver means mounted at a reception angle corresponding to the transmission angle in the housing at a second position, located a predetermined distance from the first position, for receiving the resulting signal produced upon reflection of the shear portion at the third interface and back through the second material and the casing; and
the processing means for processing the resulting signal corresponding to the reflected shear portion to determine qualitative characteristics of a bond between the second material and the third material at the third interface.

23. The apparatus of claim 22 wherein the transmission angle is substantially between the compressional-critical angle and the shear-critical angle.

24. The apparatus of claim 22 wherein the reception angle is substantially equal, but opposite to the transmission angle.

25. The apparatus of claim 22 wherein the processing means determines relative impedance of the second material and the third material in accordance with an associated reflection coefficient for a particular interface.

26. The apparatus of claim 22 wherein the processing means determines impedance amplitude in accordance with the equation:

$$A = |\eta e^{-\alpha_0 l_0} T_1 e^{-\alpha_1 l_1} T_2 e^{-\alpha_2 l_2} R_3| \quad (3)$$

where, A is the amplitude of the spectral representation of a TIE (third interface echo);

η is the product of the efficiencies of the transmitter and receiver operating in the borehole fluid, and associated electronics;

$\alpha_0$ is the attenuation coefficient in the borehole fluid;

$l_0$ is the combined propagation length in the borehole fluid, from the transmitter to the casing and from the casing to the receiver, along the TIE's path;

$T_1$ is the product of the transmission coefficients for the TIE as it passes through the first interface in both directions from the borehole into the casing and from the casing into the borehole;

$\alpha_1$ is the attenuation coefficient in the casing;

$l_1$ is the combined propagation length through the casing in both directions along the TIE's path;

$T_2$ is the product of the transmission coefficients for the TIE as it passes through the second interface in both directions from the casing into the annulus, and from the annulus into the casing;

$\alpha_2$ is the attenuation coefficient in the annulus;

$l_2$ is the combined propagation length through the annulus in both directions along the TIE's path;

$R_3$ is the reflection coefficient from the third interface for the TIE;

A, η, and the $\alpha_s$ are all functions of frequency; and $T_1$, $T_2$, and $R_3$ are all functions of the compressional and shear velocities, the densities, and the path's angles in the media, as one skilled in the art will recognize.

27. The apparatus of claim 22 wherein the receiver means has sufficient width sensitivity to receive independent resulting signal components comprising:

a shear-shear component representing a shear reflection of shear energy entering the second material at a second interface between the casing and the second material;

a shear-compressional component representing a compressional reflection of shear energy entering the second material at the second interface;

a compressional-shear component representing a shear reflection of compressional energy entering the second material at the second interface and resulting from the original shear portion; and a compressional-compressional component representing a compressional reflection of compressional energy entering the second material at the second interface and resulting from the original shear portion.

28. The apparatus of claim 22 wherein the receiver means comprises a plurality of receivers each positioned at a predetermined distance from the transmission means to receive the resulting signal dependent upon a particular thickness of the second material.

29. The apparatus of claim 22 wherein the transmission means comprises a plurality of transmitters spaced at predetermined distances.

30. The apparatus of claim 22 wherein the transmission means and the receiver means are axially aligned along a portion of the elongate housing.

31. The apparatus of claim 22 wherein the transmission means and the receiver means are circumferentially aligned along a portion of the housing.

32. A method for determining characteristics of a third interface in a borehole penetrating an earth formation from a resulting signal derived from an acoustic investigation of the third interface with a beam acoustic pulse directed at a segment of a first material forming a casing in the borehole and selected to interrogate the third interface existing between a second material located beyond the casing and a third material located beyond the second material, comprising the steps of:

establishing a reflective path between first and second locations in the borehole by:

a) transmitting the beam acoustic pulse having substantially constant width from the first location in the borehole into the casing at a transmission angle less than 90 degrees, the transmission angle being between a compressional critical angle of the casing and a shear critical angle of the casing such that:

i) a shear portion encounters a second interface and the third interface in the borehole;

ii) the shear portion of the acoustic energy reflects from the third interface back through the second material and the casing; and iii) any compressional portion of the beam acoustic pulse which enters the casing travels in a direction substantially parallel to a first interface between the borehole and casing; and (b) receiving at least one component of the resulting signal corresponding to the reflective shear portion, at the second location in the borehole at a reception angle corresponding to the transmission angle, the resulting signal produced upon reflection of the shear portion from the third interface; and processing the at least one component of the resulting signal corresponding to the reflected shear portion to determine characteristics of a bond between the second material and the third material at the third interface.

33. The method of claim 32 wherein steps (a)–(c) are performed before cement is pumped into an annulus between the first material and a formation.

34. The method of claim 32 wherein steps (a)–(c) are performed after cement is pumped into an annulus between the first material and a formation and before hydration of the cement occurs.

35. The method of claim 32 wherein steps (a)–(c) are performed after cement is pumped into an annulus between the first material and a formation and after hydration of the cement occurs.

36. The method of claim 32 further comprising the steps of:

(d) performing steps (a)–(c) before cement is pumped into an annulus between the first material and a formation;

(e) performing steps (a)–(c) after cement is pumped into an annulus between the first material and the formation and before hydration of the cement occurs;

(f) performing steps (a)–(c) after cement is pumped into an annulus between the first material and the formation and after hydration of the cement occurs; and (g) comparing the results of at least two of steps (d)–(f) to determine quality of a bond formed between materials in the borehole.

37. The method of claim 32 wherein relative impedance data is generated in accordance with an associated reflection coefficient for a particular interface.

38. The method of claim 32 wherein impedance amplitude data is generated in accordance with the equation:

$$A = |\eta e^{-\alpha_0 l_0} T_1 e^{-\alpha_1 l_1} T_2 e^{-\alpha_2 l_2} R_3| \qquad (3)$$

where, A is the amplitude of the spectral representation of a TIE (third interface echo);

$\eta$ is the product of the efficiencies of the transmitter and receiver operating in the borehole fluid, and associated electronics;

$\alpha_0$ is the attenuation coefficient in the borehole fluid;

$l_0$ is the combined propagation length in the borehole fluid, from the transmitter to the casing and from the casing to the receiver, along the TIE's path;

$T_1$ is the product of the transmission coefficients for the TIE as it passes through the first interface in both directions from the borehole into the casing and from the casing into the borehole;

$\alpha_1$ is the attenuation coefficient in the casing;

$l_1$ is the combined propagation length through the casing in both directions along the TIE's path;

$T_2$ is the product of the transmission coefficients for the TIE as it passes through the second interface in both directions from the casing into the annulus, and from the annulus into the casing;

$\alpha_2$ is the attenuation coefficient in the annulus;

$l_2$ is the combined propagation length through the annulus in both directions along the TIE's path;

$R_3$ is the reflection coefficient from the third interface for the TIE;

A, $\eta$, and the $\alpha_s$ are all functions of frequency; and $T_1$, $T_2$, and $R_3$ are all functions of the compressional and shear velocities, the densities, and the path's angles in the media, as one skilled in the art will recognize.

39. A method of interrogating a cased borehole environment in a formation to evaluate the annulus between a casing and the formation, comprising:
(a) propagating shear acoustic energy in the casing itself;
(b) as a result of (a), propagating acoustic energy beyond the casing toward the formation;
(c) as a result of (b), reflecting shear acoustic energy from an interface of at least one material situated between the casing and the formation;
(d) receiving at a position in the borehole acoustic energy which results after reflecting the shear acoustic energy from the interface; and
(e) interpreting the received, reflected acoustic energy to evaluate the annulus between the casing and the formation.

40. An apparatus for interrogating a cased borehole environment in a formation to evaluate the annulus between a casing and the formation, comprising:
(a) means located in a first position in the borehole for propagating shear acoustic energy in the casing itself and further acoustic energy between the casing and the formation;
(b) means located at a second position in the borehole for receiving resulting acoustic energy after reflecting the shear acoustic energy from an interface of at least one material situated between the casing and the formation; and
(c) means for interpreting the received reflected acoustic energy for evaluating the annulus between the casing and the formation.

41. A method of interrogating a cased borehole environment in a formation to evaluate the annulus between a casing and the formation, comprising:
(a) using a first transducer, propagating shear acoustic energy in the casing itself;
(b) reflecting shear acoustic energy from an interface beyond the casing;
(c) receiving acoustic energy resulting from (b) with a second transducer; and
(d) interpreting the received, reflected acoustic energy to evaluate the annulus between the casing and the formation.

42. An apparatus for interrogating a cased borehole environment in a formation to evaluate the annulus between a casing and the formation, wherein an interface is situated outside the casing, the apparatus comprising:
(a) means located in a first position in the borehole for propagating shear acoustic energy in the casing itself;
(b) means for receiving acoustic energy at a second position in the borehole, said acoustic energy resulting from said shear energy reflecting from the interface; and
(c) means for interpreting the received reflected acoustic energy for evaluating the annulus between the casing and the formation.

43. A method of interrogating a cased borehole environment in a formation to evaluate the annulus between a casing and the formation, comprising:
(a) propagating shear acoustic energy in the casing itself at a first position in the borehole and through a material between the casing and formation;
(b) reflecting shear acoustic energy from at least one interface located between the material and the formation;
(c) receiving acoustic energy resulting from (b) at a second position in the borehole; and
(d) interpreting the received, reflected acoustic energy to evaluate a bond between the material and the formation in the annulus between the casing and the formation.

44. The method of claim 43, including:
using a transducer to propagate beam acoustic energy at an angle to the casing such that the acoustic shear energy propagates in the casing itself and encounters the at least one interface.

45. The method of claim 44, including:
transmitting acoustic energy with the transducer into the casing at a transmission angle between a compressioned critical angle of the casing and a shear critical angle of the casing.

46. The method of claim 44, including:
receiving the transmitted beam acoustic energy at an angle corresponding to the transmission angle.

47. An apparatus for interrogating a cased borehole environment in a formation to evaluate the annulus between a casing and the formation, comprising:
(a) means located at a first position in the borehole for propagating shear acoustic energy in the casing itself and through a material in the annulus to an interface between some of the material and the formation;
(b) means located at a second position in the borehole for receiving the acoustic energy resulting from said shear acoustic energy reflecting from the interface; and
(c) means for interpreting the received reflected acoustic energy for evaluating a bond between the material and the formation in the annulus between the casing and the formation.

48. The apparatus of claim 47, including:

a means for propagating beam acoustic energy at an angle to the casing such that the acoustic shear energy encounters the interface.

49. The apparatus of claim 48, comprising:

a means for propagating the beam acoustic energy into the casing at a transmission angle between a compressioned critical angle of the casing and a shear critical angle of the casing.

50. The apparatus of claim 49, including a means for receiving the beam acoustic energy at an angle corresponding to the transmission angle.

51. A method for determining characteristics of an interface in a borehole penetrating an earth formation from a resulting signal derived from an acoustic investigation with acoustic energy directed at a segment of a first material forming a casing in the borehole and selected to interrogate an interface existing between a second material located beyond the casing and a third material located beyond the second material, comprising the steps of:

establishing a reflective path in the borehole by:
  a) transmitting the acoustic energy from the first location in the borehole into the casing at a transmission angle such that:
    i) a shear portion encounters the interface in the borehole; and
    ii) the shear portion of the acoustic energy reflects from the interface back through the second material and the casing to provide a resulting non-shear wave signal having at least one component corresponding to the reflective shear portion;
  b) receiving said at least one component of the resulting non-shear wave signal corresponding to the reflective shear portion, at a reception angle corresponding to the transmission angle; and
  c) processing the at least one component of the resulting non-shear wave signal corresponding to the reflected shear portion to determine characteristics of a bond between the second material and the third material at the interface.

52. A method for evaluating an annulus between a casing and a formation from a resulting signal derived from an acoustic investigation of a third interface with beam acoustic energy directed at a segment of a first material forming a casing in the borehole and selected to interrogate the third interface existing between a second material located beyond the casing and a third material located beyond the second material, comprising the steps of:

establishing a reflective path between first and second locations in the borehole by:
  a) transmitting the beam acoustic energy with substantially constant width from the first location in the borehole into the casing at a transmission angle less than 90 degrees, the transmission angle being between a compressional critical angle of the casing and a shear critical angle of the casing such that:
    i) a shear portion encounters a second interface and the third interface in the borehole; and
    ii) the shear portion of the acoustic energy reflects from the third interface back through the second material and the casing to provide a resulting non-shear wave signal having at least one component corresponding to the reflective shear portion;
  b) receiving said at least one component of the resulting non-shear wave signal corresponding to the reflective shear portion, at the second location in the borehole at a reception angle corresponding to the transmission angle, the resulting signal produced upon reflection of the shear portion from the third interface; and
  c) processing the at least one component of the resulting non-shear wave signal corresponding to the reflected shear portion to evaluate the annulus by determining characteristics of the second material.

53. A method for determining characteristics of a third interface in a borehole penetrating an earth formation from a resulting signal derived from an acoustic investigation of the third interface with acoustic energy directed at a segment of a first material forming a casing in the borehole and selected to interrogate the third interface existing between a second material located beyond the casing and a third material located beyond the second material, comprising the steps of:

establishing a reflective path between first and second locations in the borehole by:
  a) transmitting the acoustic energy with substantially constant width from the first location in the borehole into the casing at a transmission angle less than 90 degrees, the transmission angle being between a compressional critical angle of the casing and a shear critical angle of the casing such that:
    i) a shear portion generated in the casing itself encounters a second interface and the third interface in the borehole; and
    ii) the shear portion of the acoustic energy reflects from the third interface back through the second material and the casing to provide a resulting non-shear wave signal having at least one component corresponding to the reflective shear portion;
  b) receiving said at least one component of the resulting non-shear wave signal corresponding to the reflective shear portion, at the second location in the borehole at a reception angle corresponding to the transmission angle, the resulting signal produced upon reflection of the shear portion from the third interface; and
  c) processing the at least one component of the resulting non-shear wave signal corresponding to the reflected shear portion to determine characteristics of a bond between the second material and the third material at the third interface.

54. An apparatus for determining characteristics of an interface in a borehole penetrating an earth formation from a resulting signal derived from acoustic investigation with acoustic energy directed at a segment of a first material forming a casing in the borehole and selected to interrogate an interface existing between a second material located beyond the casing and a third material located beyond the second material, comprising:

a means for establishing a reflective path comprising a transmission means and a receiving means between which reflected acoustic energy travels;
  a) the transmission means mounted for introducing the acoustic energy into the casing at a transmission angle such that:
    i) a shear portion of the acoustic energy generated in the casing itself encounters the interface in the borehole;
    ii) the shear portion of the acoustic energy reflects from the interface back through the second material and the casing;

b) the receiver means at a predetermined distance from the transmission means mounted at a reception angle corresponding to the transmission angle for receiving the resulting signal produced upon reflection of the shear portion at the interface and back through the second material and the casing to provide a resulting non-shear wave signal having at least one component corresponding to the reflective shear portion; and a processing means for processing the resulting non-shear wave signal corresponding to the reflected shear portion to determine qualitative characteristics of a bond between the second material and the third material at the interface.

55. An apparatus for evaluating an annulus between a casing and a formation from a resulting signal derived from an acoustic investigation of a third interface with beam acoustic energy directed at a segment of a first material forming a casing in the borehole and selected to interrogate the third interface existing between a second material located beyond the casing and a third material located beyond the second material, comprising:

a) a transmission means for introducing the beam acoustic energy with substantially constant width into the casing at a transmission angle at a first interface, the transmission angle being between a compressional critical angle of the casing and a shear critical angle of the casing such that:

i) a shear portion of the beam acoustic energy generated in the casing itself encounters a second interface and a third interface in the borehole;

ii) the shear portion of the acoustic energy reflects from the third interface back through the second material and the casing to provide a resulting non-shear wave signal having at least one component corresponding to the reflective shear portion;

b) a receiving means at a predetermined distance from the transmission means at a reception angle corresponding to the transmission angle for receiving the resulting non-shear wave signal produced upon reflection of the shear portion at the third interface and back through the second material and the casing; and c) a processing means for processing the resulting non-shear wave signal corresponding to the reflected shear portion to evaluate the annulus by determining qualitative characteristics of the second material.

56. An apparatus for determining characteristics of a third interface in a borehole penetrating an earth formation from a resulting signal derived from an acoustic investigation of the third interface with acoustic energy directed at a segment of a first material forming a casing in the borehole and selected to interrogate the third interface existing between a second material located beyond the casing and a third material located beyond the second material, comprising:

a means for establishing a reflective path comprising a transmission means and a receiving means between which reflected acoustic energy travels;

a) the transmission means mounted for introducing the acoustic energy with substantially constant width into the casing at a transmission angle less than 90 degrees to a first interface, the transmission angle being between a compressional critical angle of the casing and a shear critical angle of the casing such that:

i) a shear portion of the acoustic energy generated in the casing itself encounters a second interface and a third interface in the borehole; and ii) the shear portion of the acoustic energy reflects from the third interface back through the second material and the casing;

b) the receiver means mounted at a predetermined distance from the transmission means at a reception angle corresponding to the transmission angle for receiving the resulting signal produced upon reflection of the shear portion at the third interface and back through the second material and the casing to provide a resulting non-shear wave signal having at least one component corresponding to the reflective shear portion; and c) a processing means for processing the resulting non-shear wave signal corresponding to the reflected shear portion to determine qualitative characteristics of a bond between the second material and the third material at the third interface.

* * * * *